June 25, 1957 D. KEA 2,796,696
ROACH TRAP
Filed Dec. 27, 1954 2 Sheets-Sheet 1
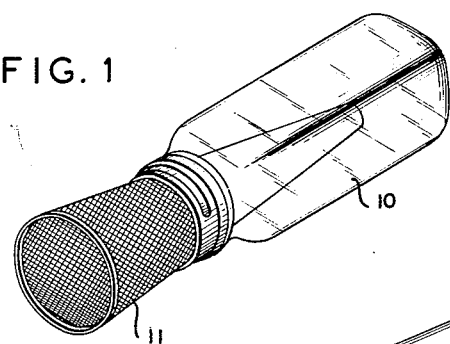
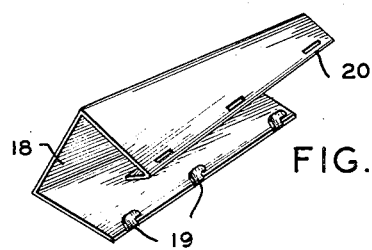
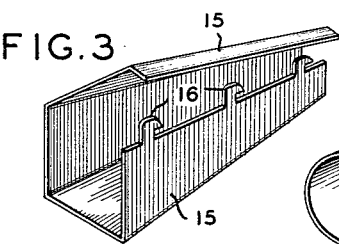
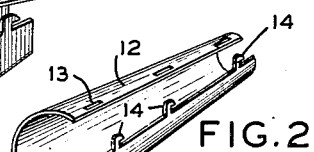
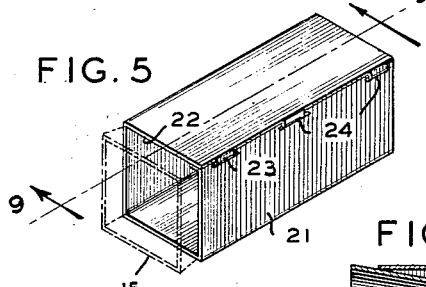
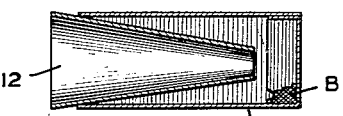
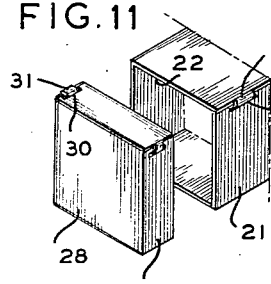
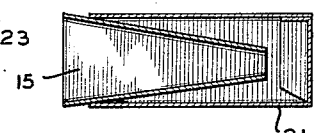
INVENTOR
DAWSON KEA
BY *H. Yates Dowell*
ATTORNEY

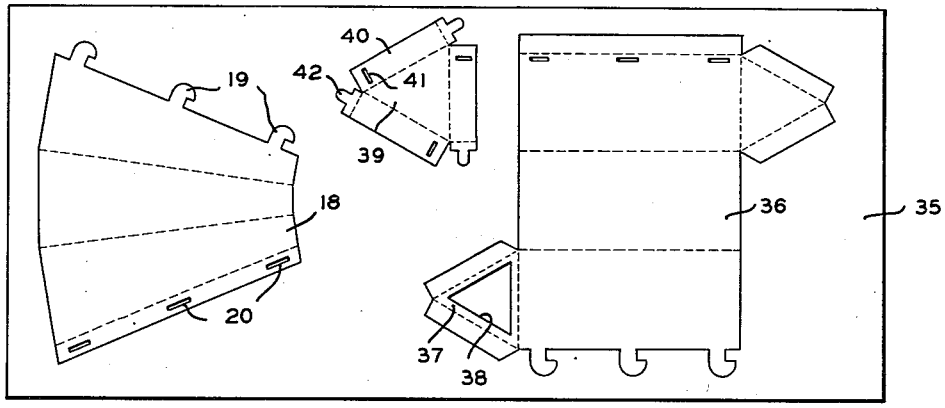
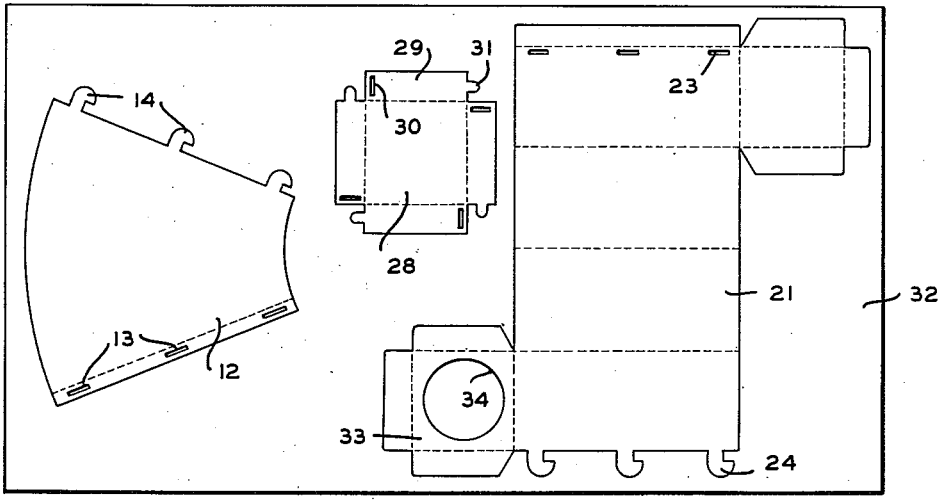
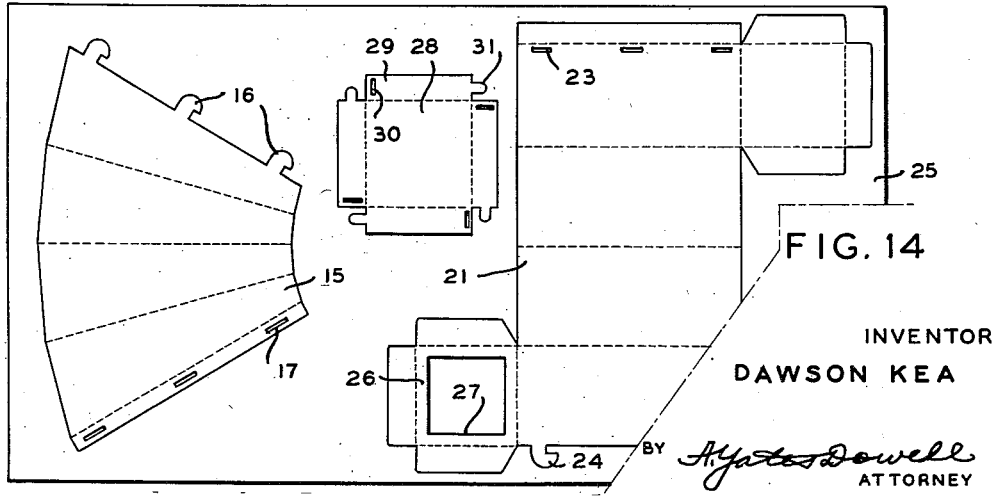

United States Patent Office 2,796,696
Patented June 25, 1957

2,796,696
ROACH TRAP
Dawson Kea, Dublin, Ga.

Application December 27, 1954, Serial No. 477,681

1 Claim. (Cl. 43—121)

This invention relates to a trap for the destruction and elimination of pests including roaches and the like.

It is an object of the invention to provide simple and inexpensive apparatus readily available to everyone for use in catching roaches, as well as a structure capable of being produced in large quantities and which in use will require minimum handling and will promote the greatest degree of sanitation.

Another object of the invention is to make it possible to provide a roach trap in the simplest manner and including a receptacle which may be of several kinds and with a trap forming insert in the form of a tapered hollow member the small end of which is adapted to be inserted in the receptacle and with the flexibility of the hollow member sufficient to maintain the parts in assembled relation but permitting ready separation.

Another object of the invention is to provide a cardboard blank having weakened lines whereby a complete trap, including a receptacle, an insertable member, and a cover, may be produced by detaching parts and folding them into shape as well as traps with receptacles of circular, square, triangular or other configuration.

Other objects and advantages of the invention will be apparent from the following description taken in conjunction with the accompanying drawing wherein:

Fig. 1 is a perspective of one application of the invention in which the receptacle is the conventional fruit jar and the cone is of metallic mesh so that it can be inserted and retained in the receptacle by its resiliency, but can be easily removed;

Fig. 2 is a perspective of a partially shaped relatively stiff piece of sheet material intended to be connected at its edges to form a tapered frusto-conical member for use instead of the member of metallic mesh;

Fig. 3 is a perspective of a partially shaped relatively stiff piece of sheet material intended to have its edges joined to provide a tapered hollow member forming the frustum of a pyramid for use in a square opening instead of a frusto-conical member in a round opening;

Fig. 4 is a similar view of a like member triangular instead of square in cross-section;

Fig. 5 is a perspective of a receptacle square in cross-section with which the tapered hollow member of Fig. 3 is adapted to be used;

Fig. 6 is a perspective of a container triangular in cross-section and with which the device of Fig. 4 is adapted to be used;

Fig. 7 is a perspective of a receptacle square in cross-section but having a circular opening at its end for the reception of the hollow frusto-conical member similar to that shown in Figs. 1 and 2;

Fig. 8 is a section on the line 8—8 of Fig. 7;

Fig. 9 is a section on the line 9—9 of Fig. 5;

Fig. 10 is a section on the line 10—10 of Fig. 6;

Fig. 11 is a perspective of the end of a receptacle such as that shown in Figs. 5, 7, 8 and 9, and a cover adapted to be applied to retain roaches within the receptacle when it is discarded; and Figs. 12, 13 and 14, views of blanks employed for producing hollow receptacles and separate covers as well as hollow tapered members of triangular, conical, and square cross-section respectively.

Briefly stated, the invention, comprises a roach trap including a receptacle which may be of circular, square, triangular or other cross-sectional configuration, and an insertable tapered hollow member of corresponding configuration and of a character such that when the hollow member is inserted the resiliency of its walls will be such that the parts will be held in assembled relation. The invention also contemplates a receptacle of any desired configuration with an opening unlike that of the receptacle but complementary to the cross sectional configuration of the tapered hollow member. In other words, the receptacle may be square with a round, square, or triangular mouth or opening and a tapered hollow insertable member corresponding in cross-section to the mouth of the receptacle.

Further, the invention contemplates an insertable tapered hollow member of heavy gage fine mesh screen wire, of hard rubber, plastic, wood, cardboard, or other material and with a container of any desired character as, for example, a fruit jar, a cardboard carton, or the like so prepared that when the insertable member is introduced it will be held in place by its flexibility with its small end near the bottom of the receptacle and its large end exteriorly of the receptacle in close contact with the surface on which the trap is placed so that the insects may travel through the same and into the interior of the receptacle but due to the spacing of the small end of the inserted member they cannot find their way out of the trap.

The invention further contemplates tapered hollow insertable members which are perforate or imperforate, transparent or opaque with the insertable members made of wire, heavy cardboard paper or the like and the receptacle being held flat or in the shape in which they will be used. In other words, the trap may be made by producing a cone of heavy gage fine mesh screen wire or other materials such as stiff cardboard or paper in flat or final shape and may be inserted in a receptacle such as a fruit jar, milk carton or the like, already in existence, or the container may be sold with the insertable member so that after it has been used hot water may be poured into the container and a cover placed thereon so that the device may be shaken to kill the roaches, after which, the cover may be removed and the device reused, or the device can be discarded with the cover in place.

With continued reference to the drawings, the present invention contemplates a roach trap including a receptacle 10 in the form of a glass fruit jar or the like, and a tapered hollow member 11 which in the present instance is of heavy gage wire mesh united with a lengthwise seam to provide a frusto-conical member of sufficient resiliency that it can be inserted in the mouth of the fruit jar where it will be held until it is removed therefrom.

The frusto-conical member 11 at its larger end is of a diameter corresponding substantially to the diameter of the fruit jar and its smaller end terminates in spaced relation from the bottom of the jar. Also, it is of such a size and resiliency that it will fit tightly into the mouth of the jar with a portion exteriorly of the mouth so that when it is placed in the fruit jar and the jar with the frusto-conical member is disposed horizontally on a supporting surface the large end of the member 11 will be substantially in contact with the surface on which it is supported so that roaches may travel slightly upwardly until they fall into the jar.

After the trap has been used for a time and roaches have been trapped they may be flushed away or a top (not shown) can be placed on the jar and the jar discarded.

Instead of the hollow tapered member being of metallic mesh a hollow tapered member 12 may be provided from stiff sheet material with slots 13 and locking tabs 14 adapted to fit into the same to lock the edges of the sheet in overlapping relation so that the frusto-conical member thus formed may be used in the same manner as the member 11.

Instead of the hollow tapered member being round in cross-section it may be of other desired configuration as, for example, in Fig. 3 it is substantially square in cross-section and includes a sheet 15 provided with locking tabs 16 similar to the tabs 14 of Fig. 2 and intended to extend through suitable slots 17 (Fig. 14) similar to the slots 13 of Fig. 2 for fastening the edges together as is well known in this art.

In Fig. 4 the hollow tapered member is substantially triangular in cross section and includes a sheet 18 having locking tabs 19 for insertion in receiving slots 20, the structure of Fig. 4 being similar to Fig. 3, except the hollow member is triangular in cross section instead of square. The side walls of Figs. 3 or 4 may be of different lengths to suit the requirements and such hollow structures may be applied to receptacles having complementary receiving openings.

In Fig. 5 is disclosed an elongated carton 21 having an open end 22 in which the hollow tapered member 15 of Fig. 3 may be inserted. The receptacle 21 has locking tabs 23 adapted to extend into slots 24 and held in assembled relation thereby and if desired, by means of adhesive. Also, on account of the relative sizes and flexibility of the hollow tapered member and the receptacle the hollow tapered member will fit frictionally within the receptacle with only a small portion of the hollow tapered member projecting therefrom but sufficient to engage the surface on which the device is supported so that roaches or other insects will be enticed by suitable bait B stuck within the receptacle remote from the entrance thereof.

The receptacle which is square in cross-section may be produced from a blank or a relatively heavy sheet 25 provided with indicating means such as weakened lines to permit the parts to be detached and folded to form the carton or hollow receptacle which is square in cross section. Also, if desired, this particular member may have an extension with an annular front to provide a frame 26 with a smaller opening 27 for the reception of the hollow tapered member 15. From the sheet 25 not only can receptacle 21 be produced but the tapered hollow member 15 and a cover 28 having a series of flanges 29 each with slots 30 at one end and tabs 31 at the other, the tab of one flange being adjacent the slot of the next flange so that when the flanges are bent at right angles to the body of the sheet they may be locked in such position by inserting the tabs within the slot.

Instead of the frame 26 being provided with a square opening 27 a blank or relatively heavy sheet 32 may be provided having an extension with a frame 33 and an opening 34. This sheet is also provided with weakened lines so that the member 12 (Fig. 2) with the opening 13 and locking tabs 14 may be detached as well as a cover 28 similar to the cover 28 previously described with regard to Fig. 4. In like manner a relatively stiff blank 35 may be provided having weakened lines or other indications so that a receptacle, a tapered hollow member, and a triangular cone may be produced therefrom. The receptacle 36 may have an end open or it may have an extension 37 with a reduced opening 38 for reception of the tapered hollow member formed from the sheet portion 18. A cover 39 with flanges 40 having slots 41 and tabs 42 may also be detached from the sheet and the tabs inserted in the slots as in the two immediately preceding figures.

It will be apparent from the foregoing that a trap is provided suitable for catching roaches and bugs of other kinds which is of small expense, can be readily and easily produced and will efficiently perform the function for which created and which may readily be discarded or reused as desired.

It will be obvious to those skilled in the art that various changes may be made in the invention without departing from the spirit and scope thereof and therefore the invention is not limited by that which is illustrated in the drawing and described in the specification, but only as indicated in the accompanying claim.

What is claimed is:

A roach trap comprising in combination an elongated receptacle having an opening in one end forming a mouth, a trap-forming gently tapered flexible member of a size to flexibly fit snugly within said mouth and with its small end located near the bottom of the receptacle, and with its large end projecting beyond the mouth, the structure of the receptacle and gently tapered member being of a character to provide cooperative flexibility sufficient to cause them to be flexibly maintained in assembled relation but permitting relatively easy separation upon the application of oppositely directed force to them, said receptacle and tapered member being adapted to be disposed on a substantially horizontal surface so that the outer end of the tapered member will be located substantially in line with the wall of the receptacle on which wall said receptacle is adapted to be supported and in close proximity to such surface for easy accessibility to a roach and when in such position providing a relatively straight gentle incline over which a roach can travel into the receptacle.

References Cited in the file of this patent

UNITED STATES PATENTS

| | | |
|---|---|---|
| 1,000,368 | Borkenhagen | Aug. 15, 1911 |
| 1,209,993 | Oettinger | Dec. 26, 1916 |

FOREIGN PATENTS

| | | |
|---|---|---|
| 10,401 | Great Britain | 1884 |
| 137,233 | Sweden | 1952 |